US012565736B2

(12) United States Patent
Aleid et al.

(10) Patent No.: US 12,565,736 B2
(45) Date of Patent: Mar. 3, 2026

(54) STATIC MIXER FOR ELECTRICAL SUBMERSIBLE PUMP (ESP) HIGH GAS/OIL RATIO (GOR) COMPLETIONS

(71) Applicant: SAUDI ARABIAN OIL COMPANY, Dhahran (SA)

(72) Inventors: Mohammed H. Aleid, Al Qatif (SA); Torty C. Kalu-Ulu, Ras Tanura (SA); James O. Arukhe, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 83 days.

(21) Appl. No.: 18/354,504

(22) Filed: Jul. 18, 2023

(65) Prior Publication Data

US 2024/0066474 A1 Feb. 29, 2024

Related U.S. Application Data

(60) Provisional application No. 63/402,298, filed on Aug. 30, 2022.

(51) Int. Cl.

| | |
|---|---|
| ***D21H 21/18*** | (2006.01) |
| ***B01F 23/23*** | (2022.01) |
| ***B01F 25/40*** | (2022.01) |
| ***D21H 17/45*** | (2006.01) |
| ***D21H 17/66*** | (2006.01) |
| ***D21H 17/67*** | (2006.01) |
| ***D21H 23/04*** | (2006.01) |
| ***E21B 43/12*** | (2006.01) |
| *B01F 101/49* | (2022.01) |

(52) U.S. Cl.

CPC ......... *D21H 21/18* (2013.01); *B01F 23/2319* (2022.01); *B01F 25/40* (2022.01); *D21H 17/455* (2013.01); *D21H 17/66* (2013.01); *D21H 17/675* (2013.01); *D21H 23/04* (2013.01); *E21B 43/121* (2013.01); *B01F 2101/49* (2022.01)

(58) Field of Classification Search

CPC ..... B01F 23/2319; B01F 25/40; D21H 23/04; E21B 43/121

See application file for complete search history.

(56) References Cited

U.S. PATENT DOCUMENTS 3,887,342 A * 6/1975 Bunnelle ............ B01D 19/0057 417/313
5,628,616 A 5/1997 Lee
(Continued)

OTHER PUBLICATIONS

First Examination Report issued in Saudi Arabian Application No. 123450234, dated Aug. 9, 2024 (6 pages).
(Continued)

*Primary Examiner* — Craig M Schneider
*Assistant Examiner* — Christopher D Ballman
(74) *Attorney, Agent, or Firm* — Osha Bergman Watanabe & Burton LLP

(57) ABSTRACT

An electrical submersible pump (ESP) completion is used in a reservoir. The ESP completion includes an ESP and a static mixer placed below an intake of the ESP within the reservoir. A two-phase (liquid-gas) mixture flows from the reservoir through a tubing-casing annulus to the static mixer. The static mixer conditions and homogenizes the two phase (liquid-gas) mixture. The mixture flows to a tubing-casing annulus through perforated joints to enter the intake of the pump.

18 Claims, 3 Drawing Sheets

(56) References Cited

U.S. PATENT DOCUMENTS

| | | | | |
|---|---|---|---|---|
| 6,167,965 | B1 | 1/2001 | Bearden et al. | |
| 6,601,651 | B2 * | 8/2003 | Grant | F04D 25/06 166/66.4 |
| 7,343,967 | B1 | 3/2008 | Floyd | |
| 9,720,424 | B2 * | 8/2017 | Ige | G05B 13/04 |
| 9,915,134 | B2 * | 3/2018 | Xiao | F04D 13/12 |
| 11,162,340 | B2 * | 11/2021 | Xiao | F04B 23/04 |
| 2008/0093084 | A1 * | 4/2008 | Knight | E21B 43/128 166/105 |
| 2009/0250210 | A1 * | 10/2009 | Allen | F04D 13/10 702/6 |
| 2010/0258306 | A1 * | 10/2010 | Camilleri | E21B 43/128 166/265 |
| 2011/0162832 | A1 * | 7/2011 | Reid | E21B 43/38 166/244.1 |
| 2013/0068454 | A1 * | 3/2013 | Armistead | E21B 43/38 166/62 |
| 2013/0259721 | A1 * | 10/2013 | Noui-Mehidi | F04B 47/06 417/410.1 |
| 2015/0233228 | A1 * | 8/2015 | Roth | E21B 43/122 166/372 |
| 2020/0072226 | A1 * | 3/2020 | Rivera Villarreal | F04D 31/00 |
| 2021/0246903 | A1 | 8/2021 | Badr et al. | |
| 2023/0135161 | A1 * | 5/2023 | Loh | E21B 47/06 73/152.51 |

OTHER PUBLICATIONS

Fetoui, Islam, "ESP: Gas handling device"; Production Technology; <https://production-technology.org/esp-gas-handling-device/>; Accessed Jul. 18, 2023 (6 pages).

Hua, Gong et al., "Comparison of Multiphase Pumping Technologies for Subsea and Downhole Applications"; Oil and Gas Facilities; vol. 1, Issue 01, Paper No. SPE-146784-PA; pp. 36-46; Feb. 2012 (11 pages).

Pessoa, Rui et al., "Experimental Investigation of Two-Phase Flow Performance of Electrical Submersible Pump Stages"; Proceedings of the SPE Annual Technical Conference and Exhibition; Paper No. SPE-71552-MS; pp. 1-16; Sep. 30, 2001 (16 pages).

* cited by examiner

STATIC MIXER FOR ELECTRICAL SUBMERSIBLE PUMP (ESP) HIGH GAS/OIL RATIO (GOR) COMPLETIONS

BACKGROUND

In the field of oil and gas, artificial lift systems are used in well production. Artificial lift is a process used on oil wells to increase pressure within the reservoir and encourage oil to the surface. Artificial lift systems include but are not limited to electrical submersible pumps (ESP), progressing cavity pumps, beam pumping, and gas lift systems. Consideration of the volume and presence of free gas is important in the design and operation of the ESP. Free gas has potential to significantly lower the necessary discharge pressure for the pump. As free gas and gas fraction at the pump inlet increases, repetitive ESP trips and poor performance may occur. Installing a static mixer will reduce the occurrence of ESP trips by minimizing the buildup of gas slugs causing gas block in the inlet.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to systems and methods for static mixer utilization in ESP completions.

In one aspect, embodiments relate to an electrical submersible pump (ESP) completion for use in a reservoir, the ESP completion comprising: an ESP and a static mixer placed below an intake of the ESP within the reservoir; wherein a two-phase (liquid-gas) mixture flows from the reservoir through a tubing-casing annulus to the static mixer, wherein the static mixer conditions and homogenizes the two phase (liquid-gas) mixture, and wherein the mixture flows to a tubing-casing annulus through perforated joints to enter the intake of the pump.

In one aspect, embodiments relate to a method of using an electrical submersible pump (ESP) completion in a reservoir, the method comprising: placing a static mixer below an intake of the ESP within the reservoir; flowing a two-phase (liquid-gas) mixture from the reservoir through a tubing-casing annulus to the static mixer; conditioning and homogenizing, via the static mixer, the two phase (liquid-gas) mixture, and flowing the mixture to the tubing-casing annulus through perforated joints to enter the intake of the pump.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
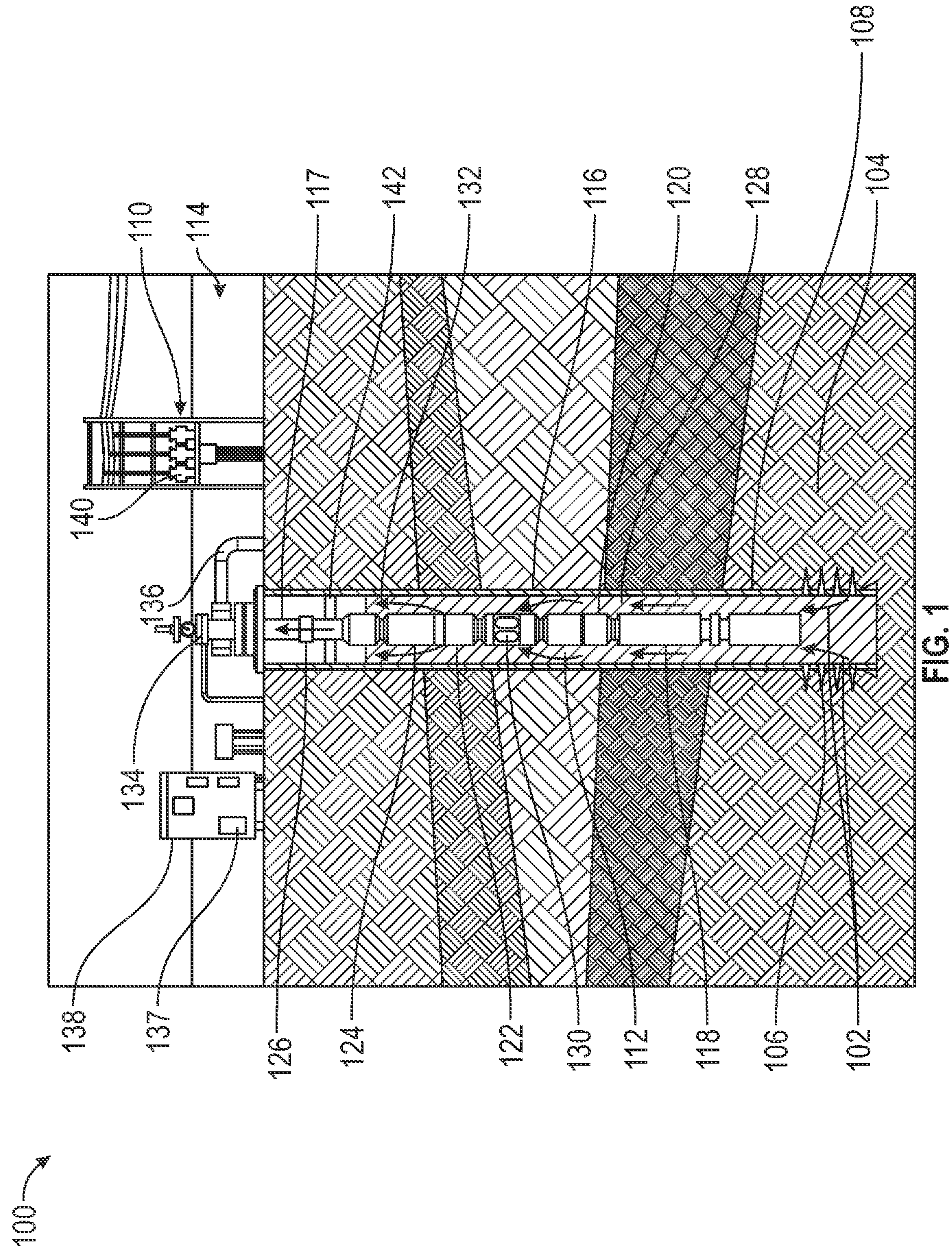
FIG. 1 shows an exemplary well with an Electrical Submersible Pump (ESP) completion design in accordance with one or more embodiments.
Figure 2:
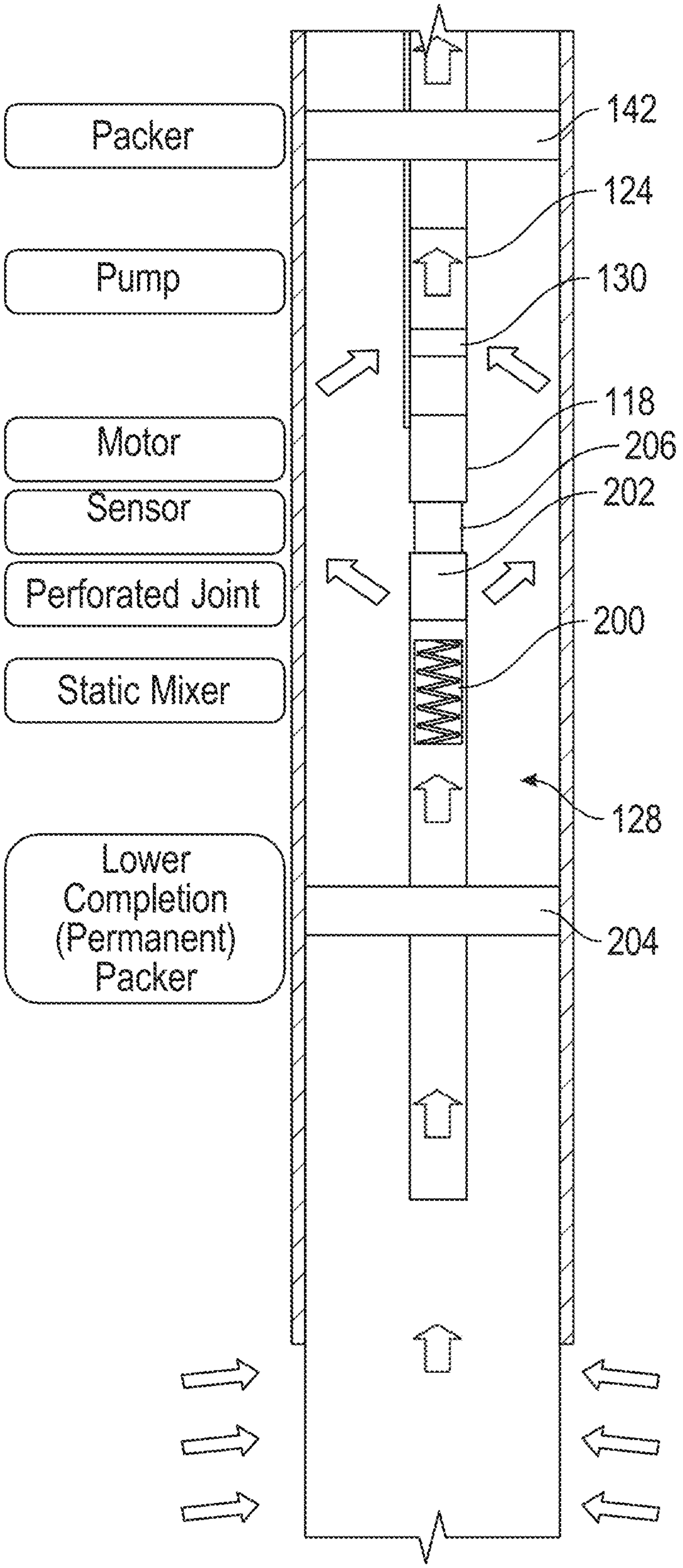
FIG. 2 is a diagram showing an embodiment of the invention.

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1 shows an exemplary ESP system (100) in accordance with one or more embodiments. The ESP system (100) is used to help produce produced fluids (102) from a formation (104). Perforations (106) in the well casing (108) provide a conduit for the produced fluids (102) to enter the well (116) from the formation (104). The well (116) may be of vertical orientation or deviated at an angle. A deviated well (116) is well known in the art. The ESP system (100) includes a surface portion having surface equipment (110) and a downhole portion having an ESP string (112).

The ESP string (112) is deployed in a well (116) on production tubing (117) and the surface equipment (110) is located on a surface location (114). The surface location (114) is any location outside of the well (116), such as the Earth's surface. The production tubing (117) extends to the surface location (114) and is made of a plurality of tubulars connected together to provide a conduit for produced fluids (102) to migrate to the surface location (114).

The ESP string (112) may include a motor (118), motor protectors (120), a gas separator (122), a multi-stage centrifugal pump (124) (herein called a "pump" (124)), and a power cable (126). The ESP string (112) may also include various pipe segments of different lengths to connect the components of the ESP string (112). The motor (118) is a downhole submersible motor (118) that provides power to the pump (124). The motor (118) may be a two-pole, three-phase, squirrel-cage induction electric motor (118). The motor's (118) operating voltages, currents, and horsepower ratings may change depending on the requirements of the operation.

The size of the motor (118) is dictated by the amount of power that the pump (124) requires to lift an estimated volume of produced fluids (102) from the bottom of the well (116) to the surface location (114). The motor (118) is cooled by the produced fluids (102) passing over the motor (118) housing. The motor (118) is powered by the power cable (126). The power cable (126) is an electrically conductive cable that is capable of transferring information. The power cable (126) transfers energy from the surface equipment (110) to the motor (118). The power cable (126) may be a three-phase electric cable that is specially designed for downhole environments. The power cable (126) may be clamped to the ESP string (112) in order to limit power cable (126) movement in the well (116).

Motor protectors (120) are located above (i.e., closer to the surface location (114)) the motor (118) in the ESP string (112). The motor protectors (120) are a seal section that houses a thrust bearing. The thrust bearing accommodates axial thrust from the pump (124) such that the motor (118) is protected from axial thrust. The seals isolate the motor (118) from produced fluids (102). The seals further equalize the pressure in the annulus (128) with the pressure in the motor (118). The annulus (128) is the space in the well (116) between the casing (108) and the ESP string (112). The pump intake (130) is the section of the ESP string (112) where the produced fluids (102) enter the ESP string (112) from the annulus (128).

The pump intake (130) is located above the motor protectors (120) and below the pump (124). The depth of the pump intake (130) is designed based off of the formation (104) pressure, estimated height of produced fluids (102) in the annulus (128), and optimization of pump (124) performance. If the produced fluids (102) have associated gas, then a gas separator (122) may be installed in the ESP string (112) above the pump intake (130) but below the pump (124). The gas separator (122) removes the gas from the produced fluids (102) and injects the gas (depicted as separated gas (132) in FIG. 1) into the annulus (128). If the volume of gas exceeds a designated limit, a gas handling device may be installed below the gas separator (122) and above the pump intake (130).

The pump (124) is located above the gas separator (122) and lifts the produced fluids (102) to the surface location (114). The pump (124) has a plurality of stages that are stacked upon one another. Each stage contains a rotating impeller and stationary diffuser. As the produced fluids (102) enter each stage, the produced fluids (102) pass through the rotating impeller to be centrifuged radially outward gaining energy in the form of velocity.

The produced fluids (102) enter the diffuser, and the velocity is converted into pressure. As the produced fluids (102) pass through each stage, the pressure continually increases until the produced fluids (102) obtain the designated discharge pressure and has sufficient energy to flow to the surface location (114). The ESP string (112) outlined in FIG. 1 may be described as a standard ESP string (112), however, the term ESP string (112) may be referring to a standard ESP string (112) or an inverted ESP string (112) without departing from the scope of the disclosure herein.

A packer (142) is disposed around the ESP string (112). Specifically, the packer (142) is located above (i.e., closer to the surface location (114)) the multi-stage centrifugal pump (124). The packer (142) may be any packer (142) known in the art such as a mechanical packer (142). The packer (142) seals the annulus (128) space located between the ESP string (112) and the casing (108). This prevents the produced fluids (102) from migrating past the packer (142) in the annulus (128).

In one or more embodiments, sensors may be installed in various locations along the ESP string (112) to gather downhole data such as pump intake volumes, discharge pressures, and temperatures. The number of stages is determined prior to installation based of the estimated required discharge pressure. Over time, the formation (104) pressure may decrease and the height of the produced fluids (102) in the annulus (128) may decrease. In these cases, the ESP string (112) may be removed and resized. Once the produced fluids (102) reach the surface location (114), the produced fluids (102) flow through the wellhead (134) into production equipment (136). The production equipment (136) may be any equipment that can gather or transport the produced fluids (102) such as a pipeline or a tank.

The remainder of the ESP system (100) includes various surface equipment (110) such as electric drives (137) and pump control equipment (138) as well as an electric power supply (140). The electric power supply (140) provides energy to the motor (118) through the power cable (126). The electric power supply (140) may be a commercial power distribution system or a portable power source such as a generator.

The pump control equipment (138) is made up of an assortment of intelligent unit-programmable controllers and drives which maintain the proper flow of electricity to the motor (118) such as fixed-frequency switchboards, soft-start controllers, and variable speed controllers. The electric drives (137) may be variable speed drives which read the downhole data, recorded by the sensors, and may scale back or ramp up the motor (118) speed to optimize the pump (124) efficiency and production rate. The electric drives (137) allow the pump (124) to operate continuously and intermittently or be shut-off in the event of an operational problem.

In ESP (124) operations, it is common for the presence of high volume of gas along with produced fluid (102) to cause a trip in the ESP (124). A person of ordinary skill in the art may appreciate that a trip in the ESP (124) may mean any issue arising in the ESP system (100) that shuts down the ESP system (100). A static mixer (200) may be placed at the pump intake (130) for an ESP (124) to serve as a simple alternative gas handling device to assist the pump performance. The simple operation of the static mixer (200) does not require several rotating parts nor a power source but allows dispersion of gas-liquid mixture while maintaining acceptable efficiency for lift operations. The main function of static mixer is to condition the fluid flow before entering the pump stages by mixing the two insoluble and immiscible oil and gas fluids and breaking gas to small bubbles and dispersing these into the oil continuous phase. In this manner, the static mixer prevents problems with gas blow and cavitation for the pump, thus increasing the life of the equipment.

It is important to consider the volume and presence of free gas in the design and operation of an ESP (124). If free gas is present and excessive, such gas has potential to significantly lower the necessary discharge pressure for the pump (124). As free gas and gas fraction at pump inlet increases, the head required drops for the same pump stages and operating parameters. The head of a pump (124) refers to the maximum height that a pump (124) can move fluid against gravity.

The static mixer (200) is an additional component to the ESP system (100) that may be placed below the pump intake (130). The fluid flow from the reservoir passes through a tubing-casing annulus (128) to the static mixer (200), where the two phase (liquid-gas) mixture may be conditioned and homogenized. Thereafter, the mixture will flow to the tubing-casing annulus (128) through one or more perforated joint(s) (202) where it enters the pump stages through the intake (130). A lower completion packer (204) may be installed in the ESP system (100). The lower completion packer (204) may be permanent.

The static mixer (200) acting in this manner, enables the pump stages to handle higher Gas Volume Fraction (GVF) without locking or cavitation as the gas bubbles will be smaller and better mixed enough not to build in the pump stages. The static mixer (200) may prevent build-up of gas bubbles, which upon expansion, is capable of interfering with the continuous fluid flow to the ESP's impeller. One or more embodiments are particularly important in high gas/oil ratio (GOR) completions.

Figure 3:
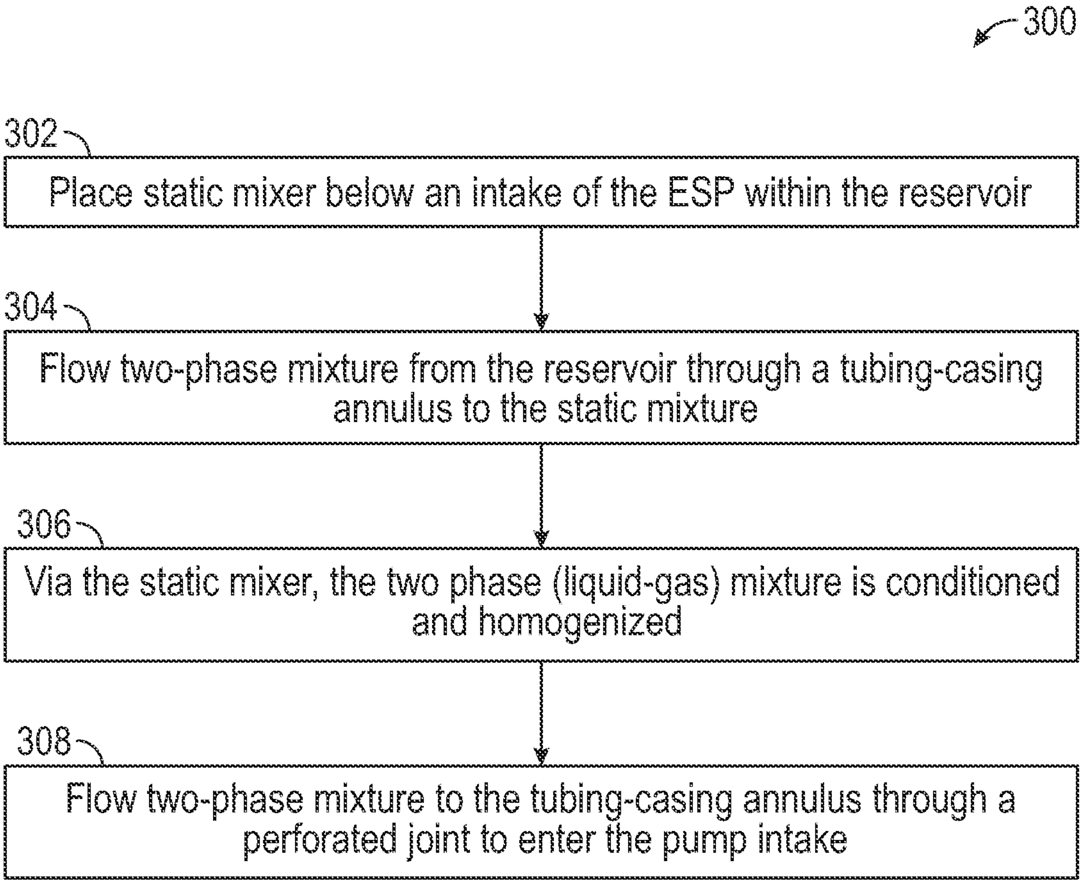
FIG. 3 is a flowchart showing an embodiment of the invention.

Referring to FIG. 3, one or more embodiments relate to a method of using an electrical submersible pump (ESP) completion in a reservoir. The method (300) involves placing (302) a static mixer below an intake of the ESP within the reservoir. Then, a two-phase (liquid-gas) mixture flows (304) from the reservoir through tubing-casing annulus to the static mixer. Via the static mixer, the two phase (liquid-gas) mixture is conditioned and homogenized (306). Finally, the mixture flows (308) to a tubing-casing annulus through perforated joints to enter the intake of the pump.

Embodiments of the present disclosure may provide at least one of the following advantages.

Advantages of one or more embodiments as compared to conventional gas handlers are as follows: i) the static mixer (200) as described in this specification does not require a power source, ii) the static mixer (200) is simple in operation (no moving parts), and iii) the static mixer (200) is flexible in design and can be placed at various locations along the fluid's flow path. Conventional gas handlers can only be strictly used directly below the main pump. Conventional gas handlers need to be mechanically connected to the ESP motor (118) shaft using a coupling. This configuration makes the system more prone to mechanical damage.

One or more embodiments of the invention solve the issue of poor ESP performance and repetitive trips caused by the presence of high volume of gas along with the produced fluid. Such events will lock the well full potential from being produced. One or more embodiments of the invention reduce the occurrence of loss of prime in ESPs (124). One or more embodiments of the invention minimizes build-up of excessive gas slugs capable of causing gas block by partially or completely blocking ESP inlet. One or more embodiments of the invention solve the problem of more frequent damage than normal to the mechanical seals, bushings, and wear rings.

The proposed technical solution is to introduce a static mixer (200) component that consumes some of the inlet pressure to disperse gas in the form of small bubbles into the continuous oil phase by flowing through helical mixing elements. This conditioning of reservoir fluid will enable smooth ESP operation. It can be flexibly connected anywhere along the fluid conduit and readily disperses gas into liquid.

Because one or more embodiments involve a static mixer (200) component, there are no moving parts and the device does not require electricity to operate. Thus, greener energy consumption is realized. Further, the device is simple to connect and use, as well as versatile in application. The device can be constructed to tubing thread or pump flanges (206).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. An electrical submersible pump (ESP) completion for use in a reservoir, the ESP completion comprising:

an ESP disposed in the ESP completion, the ESP comprising a pump intake hydraulically connected to the ESP and a tubing-casing annulus;

a static mixer disposed downhole from the pump intake configured to condition and homogenize a two-phase mixture from the reservoir to the ESP, wherein the two-phase mixture comprises liquid and gas flowing from the reservoir through the tubing-casing annulus into the static mixer; and a perforated joint disposed between the static mixer and the pump intake configured to hydraulically connect the static mixer to the tubing-casing annulus, such that the conditioned and homogenized two-phase mixture flows inside the tubing-casing annulus.

2. The ESP completion of claim 1, wherein the ESP comprises a multi-stage pump.

3. The ESP completion of claim 1, wherein the static mixer is configured to mix insoluble and immiscible fluids and disperse gas into liquid.

4. The ESP completion of claim 1, wherein the ESP completion comprises a lower completion packer disposed downhole from the static mixer.

5. The ESP completion of claim 4, wherein the lower completion packer is permanent.

6. The ESP completion of claim 1, wherein the static mixer comprises no dynamic parts.

7. The ESP completion of claim 1, wherein the static mixer is configured to be disposed in a plurality of locations along a flow path of the two-phase mixture.

8. The ESP completion of claim 1, wherein the static mixer is constructed to a tubing thread or pipe.

9. The ESP completion of claim 1, wherein the static mixer is constructed to a pump flange.

10. A method of using an electrical submersible pump (ESP) completion in a reservoir, the method comprising:

placing a static mixer below a pump intake of an ESP in the ESP completion within a tubing-casing annulus;

flowing a two-phase mixture from the reservoir through the tubing-casing annulus to the static mixer, wherein the two-phase mixture comprises liquid and gas;

conditioning and homogenizing, via the static mixer, the two-phase mixture, and directing the conditioned and homogenized two-phase mixture into the tubing-casing annulus through a perforated joint to enter the pump intake of the ESP, such that the conditioned and homogenized two-phase mixture flows inside the tubing-casing annulus.

11. The method of claim 10, wherein the ESP comprises a multi-stage pump.

12. The method of claim 10, wherein conditioning and homogenizing comprises mixing insoluble and immiscible fluids and dispersing gas into liquid.

13. The method of claim 10, wherein the ESP completion comprises a lower completion packer disposed downhole from the static mixer.

14. The method of claim 13, wherein the lower completion packer is permanent.

15. The method of claim 10, wherein the static mixer comprises no dynamic parts.

16. The method of claim 10, wherein placing the static mixer comprises disposing the static mixer in a plurality of locations along a flow path of the two-phase mixture, wherein the static mixer comprises a flexible material.

17. The method of claim 10, wherein placing the static mixer comprises constructing the static mixer to a tubing thread or pipe.

18. The method of claim 10, wherein placing the static mixer comprises constructing the static mixer to a pump flange.

* * * * *